United States Patent [19]

Guber et al.

[11] 4,097,401
[45] Jun. 27, 1978

[54] THERMODYNAMICALLY STABLE PRODUCT FOR PERMANENT STORAGE AND DISPOSAL OF HIGHLY RADIOACTIVE LIQUID WASTES

[75] Inventors: Walter Guber, Leopoldshafen; Jaroslav Saidl; Paul Daruschy, both of Karlsruhe; Werner Hild, Hochstetten, all of Germany

[73] Assignee: Gesellschaft für Kernforschung m.b.H., Karlsruhe, Germany

[21] Appl. No.: 627,310

[22] Filed: Oct. 30, 1975

[30] Foreign Application Priority Data

Jul. 30, 1975 Germany .............................. 2534014

[51] Int. Cl.$^2$ ................................................ G21F 9/34
[52] U.S. Cl. ............................. 252/301.1 W; 106/39.7
[58] Field of Search ................................. 65/17, 1, 33; 252/301.1 W; 106/39.7

[56] References Cited

U.S. PATENT DOCUMENTS

| | | | |
|---|---|---|---|
| 2,920,971 | 1/1960 | Stookey | 106/39.7 |
| 3,110,557 | 11/1963 | Spector | 252/301.1 W |
| 3,303,140 | 2/1967 | Heinemann et al. | 252/301.1 W |
| 3,489,577 | 1/1970 | Tashiro et al. | 106/39.7 |
| 3,849,330 | 11/1974 | Isaacson et al. | 252/301.1 W |
| 3,856,497 | 12/1974 | Hummel | 106/39.7 |
| 3,940,255 | 2/1976 | Harrington et al. | 106/39.7 |

OTHER PUBLICATIONS

Chem. Abstracts, vol. 75, #121136f, "Parametric Study ... Waste Solidification", 1971.
Bonniaud et al., "Fission Product Retention in Glasses and Micas", Geneva II, 1958, vol. 18, pp. 33–36 (especially pp. 34–36).
Lyng; S., "The Effect of Fluoride ... SiO$_2$", Glass Technology, vol. 9, pp. 179–184, Dec. 1968.
Goldman et al., "Retention of Fission Products ... Fusions", Geneva II, 1958, vol. 18, pp. 27–32.
Heine et al., "Research on Glasses ... Fixation", HMI--B 109 (1971) as abstracted in Chem. Abstracts, vol. 82, #159948e.
Chem. Abstracts. vol. 77, #171622y.

*Primary Examiner*—Benjamin R. Padgett
*Assistant Examiner*—Deborah L. Kyle
*Attorney, Agent, or Firm*—Spencer & Kaye

[57] ABSTRACT

Highly radioactive liquid wastes are permanently stored in a solidification matrix containing the components of a known borosilicate glass together with nucleation agents selected from the group consisting of oxides of Li, K, Mg, Mo and Cr, fluorides of those metals and of Al, and pure noble metals in the elemental form with particles with sizes smaller than 0.1 μm in diameter, and up to 35% by weight of waste fission and corrosion products or waste fission and corrosion products and gadolinium oxide. The product is produced by denitrating and calcining the radioactive waste solution, melting the calcined waste product together with a borosilicate frit containing nucleation agents at a temperature of between 1,050° and 1,200° C, and maintaining it in its melted state for 3 to 5 hours, subsequently cooling the resulting mixture until to a given temperature and maintaining it at this temperature for a given time period to permit nucleation to occur, then elevating the temperature of the mixture with an constant heating rate until to a given higher temperature, maintaining it at this higher temperature for about 24 hours, and finally cooling it with a constant cooling rate to ambient temperature.

7 Claims, No Drawings

THERMODYNAMICALLY STABLE PRODUCT FOR PERMANENT STORAGE AND DISPOSAL OF HIGHLY RADIOACTIVE LIQUID WASTES

BACKGROUND OF THE INVENTION

The present invention relates to a glass ceramic product or glass ceramic-like product for the permanent disposal of highly radioactive wastes in a manner which will not endanger the environment or the biocycle.

In order to solidify, or fix, waste radionuclides of highly radioactive waste liquids, particularly from aqueous waste solutions from the first extraction cycle of a reprocessing process for irradiated nuclear fuel or breeder materials, it has long been the custom, among other methods or solidification, to melt such wastes in glass or ceramic materials. The problems relating to such a procedure have been discussed frequently by persons skilled in the art and described in technical literature.

A solidification matrix of borosilicate glass was considered to be particularly suitable for the solidification of highly radioactive wastes and for transporting the solidified products to a permanent storage location intended for such purpose, as well as for storing the wastes in metal containers in such permanent storage location.

Temperatures of between 200° and exceptionally 800° C (axial temperature) can be expected in the produced highly active glass blocks after solidification of highly radioactive wastes, as described by E. Schiewer, W. Heimerl, H. Heine in "Kristallisation in alkaliarmen Borosilicatgläsern für die Fixierung von Spaltprodukten" (Crystallization in Low-alkali Borosilicate Glasses for Fixing Fission Products), Report of the Reactor Meeting at Hamburg, April 11th to 14th, 1972, at pages 275–278. Therefore it must be expected that the glasses will crystallize. There also exists a possibility that the fission products will segregate. Furthermore, during crystallization various physicochemical properties, such as resistance to leaching, mechanical resistance and heat conductance, may change. Knowledge of the crystallization processes is thus necessary to determine the suitability of glasses for the solidification of highly radioactive wastes.

Systematic tests with borosilicate glasses have shown that a glass of the following composition seems to be suitable for fixing the presently encountered waste solutions containing highly radioactive fission products:

$4\ SiO_2 / 2\ B_2O_3 / 1\ Al_2O_3 / 2\ CaO / 3\ Na_2O$.

In order to improve retention of the fission product nuclide cesium, it has been proposed to add approximately 10 percent by weight $TiO_2$ to the components of the various proposed borosilicate glass compositions, as described by G. Rudolph, J. Saidl, S. Drobnik, W. Guber, W. Hild, H. Krause and W. Müller in "Lab-scale work on fission product solidification by vitrification and thermite processes", Symposium on the Management of Radioactive Wastes from Fuel Reprocessing, Proceedings of a Symposium organized jointly by the OECD Nuclear Energy Agency and the International Atomic Energy Agency; OECD Paris, Nov. 27th to Dec. 1st, 1972 (March 1973), pages 655–681. Among the basic glasses listed in Table 1 of that presentation, one glass is mentioned (VG 39) which contains an additive of 6.7 percent by weight $Li_2O$. It is known that $Li_2O$ can improve the leaching resistance of a glass. Fission product nuclide oxides were introduced, in concentrations of 20 and 19 percent by weight, respectively, into two of the above-mentioned types of glass. The resulting glass blocks, or solidification products, have the following compositions:

|  | Product "38" (in % by weight) | Product "39" (in % by weight) |
| --- | --- | --- |
| $SiO_2$ | 42.0 | 44.0 |
| $TiO_2$ | 8.0 | 8.1 |
| $Al_2O_3$ | 2.0 | 5.4 |
| $B_2O_3$ | 8.0 | 7.3 |
| CaO | 4.0 | 0 |
| $Na_2O$ | 16.0 | 10.8 |
| $Li_2O$ | 0 | 5.4 |
| fission nuclide oxides+ | 20.0 | 19.0 |
| density g/cm$^3$ | 2.77 | 2.59 |
| softening point ° C (microscopic) | 760 | 641 |

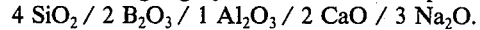

+ from a simulated solution which corresponded to a highly active waste solution resulting from the reprocessing of fuel from a rapid breeder but without Tc, Pm and transuranium elements.

The solidification products were obtained, on a laboratory scale, according to the following process:

The basic glass was pulverized and fed into a melting crucible in batches. The simulated fission nuclide solution was introduced in measured partial quantities into the powdered glass at 10 minute intervals after the solution had been denitrated in formic acid for 3 hours and was there subjected to evaporation. For a 2 liter charge, 5 to 6 hours was required to complete this process. Then the temperature in the melting crucible was raised to 1100° C, the mass in the crucible was melted (about 3 hours) and then poured into a graphite mold which had been preheated to 600° C, causing the temperature of the mold to rise to about 700° C. The finished glass product was left to cool overnight at a rate of temperature decrease of $\leq 70°$ per hour.

Generally, glasses are thermodynamically metastable. The good stability of glass under normal conditions is dependent on the condition that no energy is introduced which shifts the metastable state into the direction of a more stable state, i.e., that of spontaneous crystallization. Such process is responsible, for example, for devitrification. Particularly when highly active wastes are solidified, it has previously been impossible, due to the high contents of fission products, to avoid long-term changes in the direction toward the thermodynamically more stable crystalline structures and devitrification may result in complete destruction of the glass structure. Such devitrification is a result of the radioactive decay energy of the waste radionuclides.

All solidification products of a similar type previously described in literature have exhibited such destruction phenomena at an earlier or later point in time. In such case, permanent disposal of highly radioactive wastes in a manner harmless to the environment and the biocycle, is no longer assured.

SUMMARY OF THE INVENTION

It is an object of the present invention to provide a solidification matrix based on a glass-like or ceramic-like composition for highly radioactive waste liquids which, with respect to permanent solidification and permanent inclusion of radionuclides, as well as permanent disposal of highly radioactive wastes in a manner harmless for the environment and the biocycle, exhibits significantly better properties when compared to the known glass or ceramic matrices.

More specifically, the present invention provides a matrix which has a higher thermodynamic stability and which does not suffer any structural changes in the course of an extended period of storage and under temperature and radiation stresses inherent to highly active waste solidification products.

A further object of the invention is to produce a solid product, comprising the waste radionuclides and the solidifying matrix, in a continuous flow process at relatively low temperatures, i.e., temperatures below 1200° C, in a simple manner and without additional difficulties in conventional melting plants.

The invention is further concerned with eliminating of drawbacks of known solidification products of a glass or ceramic-like type with incorporated radionuclides, such as individual fission product nuclides or a mixture thereof, for example.

These and other objects are accomplished, according to the present invention, in a surprisingly simple manner by a thermodynamically stable glass ceramic product or glass ceramic-like product, of the above-mentioned type, composed of a solidifying matrix which contains, in addition to the components of a known borosilicate glass of the type $SiO_2$-$TiO_2$-$Al_2O_3$-$B_2O_3$-$CaO$-$Na_2O$, nucleation agents selected from the group consisting of oxides of Li, K, Mg, Mo and Cr, fluorides of these metals and of Al, and pure noble metals in a very finely dispersed form, i.e., particles with sizes between 0.01 and 0.1 μm in diameter, and of up to 35 percent by weight of waste fission and corrosion products or of waste fission and corrosion products and gadolinium oxide.

According to the invention, the glass ceramic product or glass ceramic-like product consists of, by weight:

| | | |
|---|---|---|
| 35 to | 50% | $SiO_2$ |
| 3 to | 6% | $TiO_2$ |
| 5 to | 10% | $Al_2O_3$ |
| 3 to | 6% | $B_2O_3$ |
| 3 to | 6% | MgO |
| 3 to | 6% | CaO |
| 8 to | 10% | $Li_2O$ |
| 3 to | 6% | $K_2O$ |
| 0 to | 5% | $Na_2O$ |
| 20 to | 30% | waste fission and corrosion products where the sum of the fission and corrosion |
| 0 to | 11% | $Gd_2O_3$, products and $Gd_2O_3$ is not more than 35% by weight. |

The objects of the invention are also achieved by a process for producing a thermodynamically stable glass ceramic product or glass ceramic-like product, which involves denitrating and calcining a highly radioactive waste solution in a known manner, then mixing the calcination product with a borosilicate frit, i.e., a pulverized or granulated borosilicate glass mass, which had been produced by melting under addition of nucleation agents, heating the mixture to a temperature in the region between 1050° and 1200° C and melting it for a period of time between 3 and 5 hours, introducing the substantially homogenized melt into a transporting vessel, cooling the melt in this vessel to about 400° C in a short time dependent on the melt quantity, maintaining the cooled mixture at this temperature for about 24 hours for nucleation to occur, thereafter heating the mixture with constant heating rate to about 600° C within a short time, then maintaining the mixture at this temperature for about 24 hours, and finally cooling the mixture with a constant cooling rate slowly at a temperature gradient of $\leq 10°$ per hour to ambient temperature.

The denitration of the highly active waste solution may be effected with an excess of formic acid and then produces particularly finely dispersed noble metal particles, e.g. Ru, Rh or also Pd, which act as additional nucleation centers.

The particular advantages of the present invention are that although the products of the invention receive a microcrystalline structure during their production but they do not disintegrate and remain unchanged compact. Compared to conventional glass ceramics which are molten between 1500° and 1600° C and could not be utilized for the incorporation of radionuclides for this reason, the products of the present invention can be melted at much lower temperatures, i.e, between 1050° and 1200° C. Moreover, the physical and chemical properties of the product are improved compared to the prior art solidified products, these improvements including increased mechanical and chemical stability, improved heat conductivity and lower coefficient of thermal expansion. The improvement in stability and in the other properties of the solidified product intended for permanent storage most of all assure safe storage for very long periods of time, even quasi-unlimited.

DESCRIPTION OF THE PREFERRED EMBODIMENTS

The following examples serve to further explain the invention. However, the invention is not limited to these examples.

EXAMPLE 1

A highly radioactive waste solution containing the following elements

| Element | g/l | Residue on ignition at 900° C | g/l |
|---|---|---|---|
| Rb | 0.32 | $Rb_2O$ | 0.35 |
| Cs | 3.54 | $Cs_2O$ | 3.75 |
| Sr | 1.11 | SrO | 1.31 |
| Ba | 1.36 | BaO | 1.52 |
| Y | 0.59 | $Y_2O_3$ | 0.75 |
| La | 1.24 | $La_2O_3$ | 1.46 |
| Ce | 2.47 | $Ce_2O_3$ | 2.90 |
| Pr | 1.13 | $Pr_2O_3$ | 1.32 |
| Nd | 3.92 | $Nd_2O_3$ | 4.57 |
| Pm | 0.21 | $Pm_2O_3$ | 0.24 |
| Sm | 0.39 | $Sm_2O_3$ | 0.46 |
| Eu | 0.04 | $Eu_2O_3$ | 0.04 |
| Gd | 0.002 | $Gd_2O_3$ | 0.002 |
| Zr | 4.14 | $ZrO_2$ | 5.60 |
| Mo | 3.45 | $MoO_3$ | 5.18 |
| Tc | 0.86 | $TcO_2$ | 1.14 |
| Ru | 1.56 | Ru | 1.56 |
| Rh | 0.42 | Rh | 0.42 |
| Pd | 0.22 | Pd | 0.22 |
| Te | 0.45 | $TeO_2$ | 0.57 |
| U | 0.76 | $U_3O_8$ | 0.90 |
| Pu | 0.01 | $PuO_2$ | 0.01 |
| Np | 0.003 | $NpO_2$ | 0.003 |
| Am | 0.08 | $AmO_2$ | 0.1 |
| Cm | 0.02 | $CmO_2$ | 0.02 |
| Fe | 2.26 | $Fe_3O_4$ | 3.13 |
| Cr | 0.63 | $Cr_2O_3$ | 0.92 |
| Ni | 0.40 | NiO | 0.51 |
| Na | 3.55 | $Na_2O$ | 4.79 |
| Total | 35.13 | | 43.74 | was denitrated and calcined, mixed with a borosilicate frit and then melted for 4 hours at 1150° C. Then the melt was shortly cooled to 400° C, kept at this temperature for 24 hours, then shortly heated to 600° C and kept at that temperature for 24 hours. Thereafter it was slowly cooled for about 50 hours to the storage temperature.

The first cooling to the nucleation temperature 400° C and the followed reheating to crystallization temperature (about 600° to 650° C) were carried out with a constant temperature gradient of 5° C/min. The storage temperature depends on the storage conditions for example on water cooled engineering storage (< 100° C), or on storage in a salt formation (about 300° C).

During the drain off of the glass melt out of the melting crucible into the recipient the melt is cooled from 1150° C to about 700° to 750° C, so that the further controlled cooling up to 400° C begins only at this temperature.

The denitration and calcining of a highly radioactive waste solution are well known procedures. The denitration can for example carried out according the U.S. Pat. No. 3,673,086. The calcining is a prior stage to all vitrification processes of radioactive waste solutions and as such well known to persons skilled in the art and described in technical literature.

The product contained, by weight:

| | |
|---|---|
| $SiO_2$ | 40% |
| $TiO_2$ | 4% |
| $Al_2O_3$ | 8% |
| $B_2O_3$ | 4% |
| MgO | 4% |
| CaO | 4% |
| $Li_2O$ | 8% |
| $K_2O$ | 4% |
| $Na_2O$ | 4% |
| fission and corrosion products | 20% |
| $Gd_2O_3$ App. | 0% |

EXAMPLE 2

The procedure followed was the same as in Example 1, except that use was made of a borosilicate frit which contained no CaO and no $Na_2O$, but which did contain, as an additive, $Gd_2O_3$. The following product was obtained, all percentages being by weight:

| | |
|---|---|
| $SiO_2$ | 38.9% |
| $TiO_2$ | 3.9% |
| $Al_2O_3$ | 4.6% |
| $B_2O_3$ | 3.9% |
| MgO | 3.9% |
| CaO | 0 % |
| $Li_2O$ | 9.8% |
| $K_2O$ | 3.9% |
| $Na_2O$ app. | 0 % |
| fission and corrosion products | 20.0% |
| $Gd_2O_3$ | 11.1% |

The minimum concentration of nucleation centers required for begin of nucleation is between $10^{13}/cm^3$ and $10^{15}/cm^3$. This amount is given or is exceeded by the presence of one of each nucleation agent which are above described. The amount of nucleation centers is increased however by combination of these nucleation agents in the matrix and additionally by fine disperse particles of noble metals contained in the highly radioactive waste solution before solidification. Therefore a nearly complete crystallization is available by the said combinations of nucleation agents within the said percentage ranges and by the treating according to the present invention. The content of nucleation agents in a borosilicate matrix can be widely varied and allows a great number of combinations for percentages of the agents within the stated limits.

An even efficient lowest concentration of fission and corrosion products is given by requiring a volume reduction of radioactive wastes as liquid to solid as 10 to 1, and by requiring an upper limit for the amount of heat produced by radioactive decay of about 4o Watt/$dm^3$ glass ceramic or glass ceramic-like product. From this in connection with a radioactive waste solution containing a mixture of about 2.5 years old fission and corrosion products, it results a concentration of fission and corrosion products of 20% by weight in the product according to the invention.

The content of $Gd_2O_3$ results form highly radioactive waste solutions (HAW) from a special run of a reprocessing procedure, which contain gadolinium salts, such as gadolinium nitrate, to avoid criticality.

Compositions with minor concentrations of $Li_2O$ produce ceramic or glass ceramic products, but these products must be melted at high temperatures, for example at 1500° C or more, what again leads to undesirable losses of radioactive substances by sublimation.

Therefore the concentration of $Li_2O$ and the concentrations of the other nucleation agents must be held in the limits described to hold the melting temperature as low as possible and to yield useful products though.

The physical and chemical properties of products according to the present invention have been found to have the following values:

Specific weight: 2.8 – 3.0 g/$cm^3$
Transformation point for glass: 450 – 500° C
Dilatometric softening point: app. 500° C
Coefficient of thermal expansion: $10^{-5} - 10^{-6} °C^{-1}$ (up to 500° C)
Heat conductivity: 1.2 – 2.2 w/m° C (at 400° C)
Specific heat: app. 0.35 cal/g° C
Leaching rate: $10^{-4} - 10^{-5}$ g/$cm^2$ d It will be understood that the above description of the present invention is susceptible to various modifications, changes and adaptations, and the same are intended to be comprehended within the meaning and range of equivalents of the appended claims.

What is claimed is:

1. A thermodynamically stable microcrystalline glass ceramic or glass ceramic-like product for permanent disposal and storage of highly radioactive wastes in a manner harmless to the environment or the biocycle, comprising:

(a) a solidifying matrix containing the components of a borosilicate glass including, by weight of the thermodynamically stable product, 35 to 50% $SiO_2$, 3 to 6% $TiO_2$, 5 to 10% $Al_2O_3$, 3 to 6% $B_2O_3$, 0 to 5% $Na_2O$;

(b) a plurality of nucleation agents, including, by weight, 3 to 6% MgO, 8 to 10% $Li_2O$ and 3 to 6% $K_2O$; and (c) 20 to 30% by weight of waste fission and corrosion products; said thermodynamically stable product is producible by a process with a highest process temperature used of 1200° C or less.

2. A product as defined in claim 1, which contains at least one further nucleation agent, selected from the group consisting of oxides of Mo and Cr, fluorides of the metals Li, K, Mg, Mo, Cr and Al, and pure noble metals in the form of particles with sizes between 0.01 and 0.1 μm in diameter.

3. A product as defined in claim 1, which further contains 0 to 11% $Gd_2O_3$, where the sum of the fission and corrosion products and $Gd_2O_3$ is not more than 35% by weight.

4. A thermodynamically stable microcrystalline glass ceramic or glass ceramic-like product for permanent disposal and storage of highly radioactive wastes in a manner harmless to the environment or the biocycle, comprising:
   (a) a solidifying matrix containing the components of a borosilicate glass including, by weight of the thermodynamically stable product, 35 to 50% $SiO_2$, 3 to 6% $TiO_2$, 5 to 10% $Al_2O_3$, 3 to 6% $B_2O_3$, 0 to 5% $Na_2O$;
   (b) a mixture of nucleation agents consisting of, by weight, 8 to 10% $Li_2O$, 3 to 6% $K_2O$, 3 to 6% $MgO$ and 1 to 1.5% noble metal fission products in elemental form with particle sizes between 0.01 and 0.1 μm in diameter; and
   (c) 20 to 30% by weight of waste fission and corrosion products excluding Ru, Rh, and Pd; said glass ceramic or glass ceramic-like product is producible with a highest process temperature used of 1200° C or less.

5. A product as defined in claim 4, which further contains 0 to 11% $Gd_2O_3$, where the sum of the fission and corrosion products and $Gd_2O_3$ is not more than 35% by weight.

6. A product as defined in claim 1 in which the glass further includes 3 to 6% $CaO$.

7. A product as defined in claim 4 in which the glass further includes 3 to 6% $CaO$.

* * * * *